June 16, 1959  A. C. MULDER  2,891,210
MAGNETICALLY CONTROLLED VARIABLE CURRENT TRANSFORMER
Filed Sept. 8, 1953

INVENTOR.
Allan C. Mulder
BY
*Andrus & Sceales*
Attorneys

United States Patent Office 2,891,210
Patented June 16, 1959

2,891,210

MAGNETICALLY CONTROLLED VARIABLE CURRENT TRANSFORMER

Allan C. Mulder, Appleton, Wis., assignor to Miller Electric Manufacturing Company, Appleton, Wis., a corporation of Wisconsin Application September 8, 1953, Serial No. 379,040

11 Claims. (Cl. 321—19)

This invention relates to an electromagnetically controlled variable current transformer.

An object of the invention is to provide a transformer having a current output which is adjustable over a wide range of values.

Another object of the invention is to provide a control device for governing the output of a transformer and which may be connected to a conventional transformer.

Another object of the invention is to provide a control of the output of a transformer by the insertion and removal of an inductance in the secondary circuit of the transformer.

In general, the present invention is an improvement of the variable current transformer disclosed in Patent No. 2,644,109, entitled "Variable Current Welding Transformer," and issued to applicant on June 30, 1953. The transformer disclosed in the above application is a three-phase transformer and has the conventional primary and secondary windings wound on a three-legged core. The primary windings are independently connected across the various phases of a suitable three-phase source. The transformer output in the referred to application is governed by three control cores, each of which is linked to a corresponding secondary winding of the transformer. Regulation of the transformer output is achieved by controlling the saturation of the control cores through one or more direct current control windings.

The present improvement of the transformer described and claimed in the above-named application comprises the insertion of an additional winding on each of the control cores. This additional winding is connected in series with the secondary circuit of the transformer and varies the output thereof by altering the inductive reactance in the secondary circuit.

Figure 1:
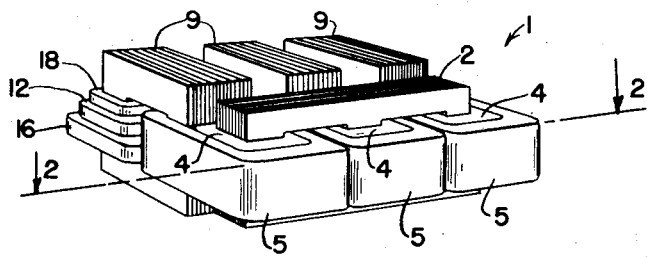
Figure 1 is a perspective view of a three-phase transformer provided with a control winding.

Referring to the drawings, there is illustrated a three-phase transformer 1 similar to that described and claimed in my previously referred-to application. A laminated, magnetizable core 2 has three parallel connected legs 3 with a separate primary winding 4 wound on each leg. Each primary winding 4 is independently connected across a different phase of a suitable three-phase alternating current source.

Figure 2:
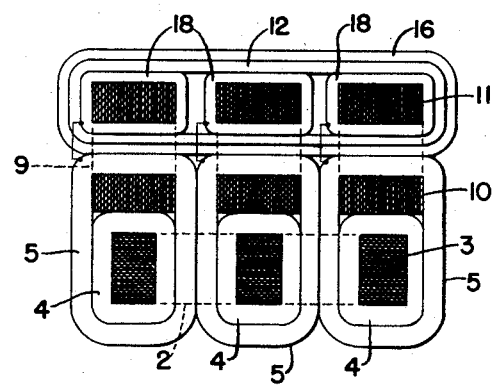
Figure 2 is a view taken on a horizontal plane through line 2—2 of Fig. 1.
Figure 3:
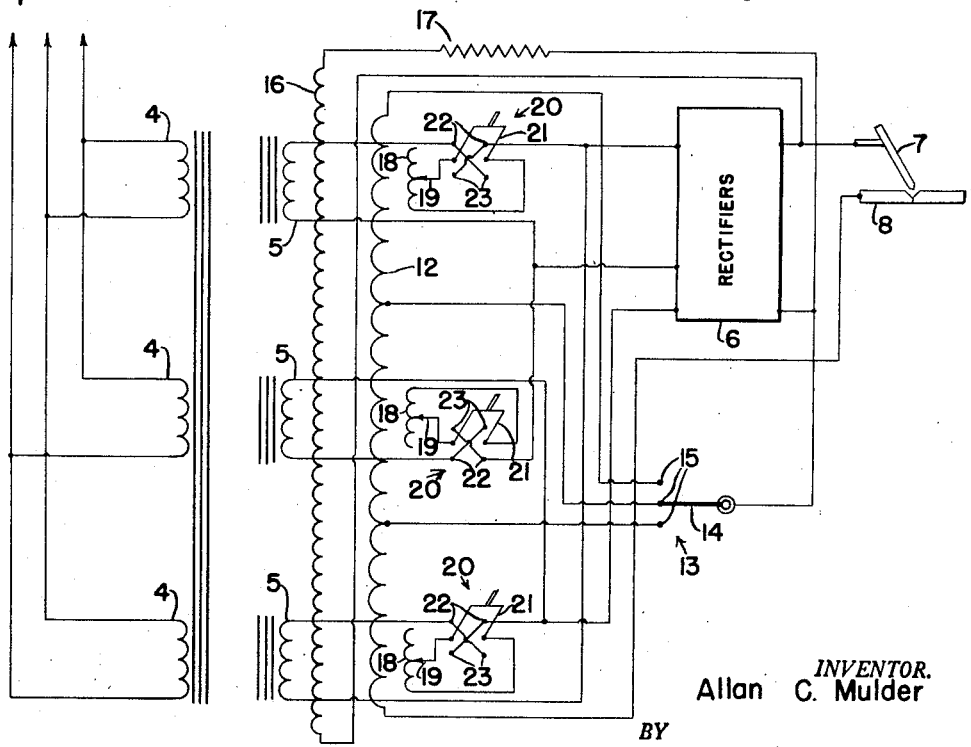
Figure 3 is a schematic wiring diagram of the transformer incorporated into an arc welding system.

As more clearly shown in Fig. 2, a secondary winding 5 is wound around each core leg 3 exteriorly of the respective primary winding 4. In Fig. 3, the secondary windings 5 are illustrated as being connected in delta and have their outputs leading into a bank of rectifiers 6 which are of any type adapted to convert the output of the three-phase transformer into direct current. The direct current output of rectifiers 6 is fed to an arc welding electrode 7 and the work 8 which is to be welded.

Linked with each of the secondary windings 5 is a control core 9 in such a manner that an inner leg 10 is disposed between the exterior surface of primary winding 4 and the interior surface of a corresponding secondary winding 5. An outer leg 11 is disposed in spaced parallel relation with leg 10 and connected through yokes to form a rectangular-shaped core. The core 9 is formed of laminated ferromagnetic metal.

In order to control the saturating flux of core 9, a current feedback control coil 12 is wound around the three outer legs 11 of control core 9. To vary the saturation of the control core 9, direct current is feed back to coil 12 from the output of rectifiers 6 through the series connected elements; coil 12, a selector switch 13, rectifier 6, electrode 7 and work 8.

The selector switch 13 has a pivotable arm 14 connected to the output of rectifier 6 and a plurality of terminals 15 connected, respectively, to a plurality of taps on the control coil 12. By movement of arm 14 to the various terminals, the number of current feed-back control coil turns receiving the welding current may be varied, and the saturation of control core 9 may be regulated accordingly.

The saturation of control core 9 may be further regulated by provision of voltage feed-back control coil 16. The voltage control coil 16 is linked with the three outer legs 11 of control core 9 and connected across the output of the rectifier in series with an adjustment resistor 17.

The control coil 16 may, and usually is, activated by an independent D.C. voltage source with current control secured through a variable resistor. Other methods of varying the saturating current through control coil 16 may also be applied. Additional control windings may be placed around the three outer legs 11 of the control cores 9 and various portions of the control flux may be contributed by each coil.

The transformer 1 as described above is set forth and claimed in my co-pending application previously referred to. As more fully explained therein, the output of the transformer is regulated by varying the saturation of the control core 9. As the saturation of the control core 9 is increased, the reluctance is correspondingly increased. Increasing the reluctance of the control core 9 weakens the alternating magnetic field set up therein by the alternating current in the secondary winding 5. Accordingly, the voltage induced back into the secondaries 5 by the control core field is decreased and the transformer current output increased.

In order to provide further regulation of the transformer output, the present invention comprises the addition of an inductance winding in each of the secondary circuits, which is described as follows:

An additional winding 18 is wound around the control core 9 and is connected in series with the corresponding secondary winding 5 and the rectifier 6. The winding 18 is disposed about the leg 11 adjacent the coil 16, as illustrated in Fig. 1, or on any other portion of the control core 9. This additional winding 18 provides additional inductance in each of the secondary circuits.

As illustrated in Fig. 3, a movable tap connection 19 permits regulation of the number of turns of winding 18 inserted into the circuit. Therefore, by adjustment of the tap connection 19 the inductance inserted into the secondary may be controlled.

The winding 18 is connected in the secondary circuit by means of a reversing switch 20 which permits the reversing of the winding connection within the circuit. For purposes of illustration, reversing switch 20 is shown as a conventional double pole double throw switch with simultaneously moving contacts 21 to engage with two alternative sets of fixed contacts 22 and 23 as the contacts 21 are moved forwardly or backwardly, respectively.

For the operating principle and the effect of winding 18, consider the following: The inductive reactance of the secondary 5 can be thought of as made up of two components, that contributed by the transformer core 2 and the other contributed by the reactor control core 9. Since the magnetic characteristics of core 9 can be varied by the D.C. controlling flux, the inductive reactance due to linkage with core 9 is variable.

If winding 18 is connected additive, producing flux in the same direction as the secondary winding, the variable inductance in the secondary circuit is increased. If winding 18 is connected so that it produces flux in the opposite direction to that produced by the secondary winding, the variable inductance in the secondary circuit is deceased. Thus maximum output is secured when the several turns of winding 18 are connected in opposition to the secondary turns and minimum output is obtained when the turns are connected to aid the secondary flux.

The above increase or eduction in current is in addition to that arising from varying the magnetic field set up in the control core by other control windings. As described in my co-pending application, previously referred to, the field induces back into the secondary winding a voltage opposite in direction to the voltage induced therein by the primary windings 4.

Further, the induced voltage in the winding 18 by the alternating magnetic field may be added or subtracted in the secondary by closing the contacts 22 or 23, respectively with the movable contact 21.

As soon as the electrode 7 contacts the work 8, direct current flows through current feed-back control coil 12, to saturate or partially saturate the cores 9. The reluctance of the cores 9 is increased with a resultant decrease in the inductance of winding 18. Further, the voltage induced back into the secondaries 5 by the control core field will be decreased. Both the decrease in the inductance and voltage acts to make the transformer current output correspondingly greater.

The present invention provides a compact welding transformer which is capable of producing welding currents over a wide range of values.

Various modes of carrying out the invention are contemplated as within the scope of the following claims particularly pointing out and distinctly claiming the subject matter which is regarded as the invention.

I claim:

1. In a variable current transformer, a primary winding connected to a source of power, an output circuit having a secondary winding disposed in inductive relation with said primary winding, a control core of magnetizable material entirely independent of said primary winding and linked in direct inductive relation with said secondary winding, electrical means to vary the reluctance of said control core, and an alternating current control coil wound on said control core and connected in series circuit with said secondary winding to permit the varying of the inductance in said secondary winding.

2. A variable current transformer comprising a transformer core of a magnetizable material, a primary winding wound on said core and connected to a source of power, an output circuit having a secondary winding wound on said core in inductive relation to said primary winding, a control core of a magnetizable material linked with said secondary winding exteriorly of said primary winding, an alternating current control coil wound on said control core and connected in series with said secondary winding to increase the inductance of said output circuit, means to vary the number of turns of said control coil connected in circuit to permit varying of the added inductance, and a second control coil wound on said control core and energized by a source of variable direct current to variably saturate said control core and thereby vary the reluctance of said control core.

3. A variable current transformer comprising a transformer core of magnetizable material, a primary winding and a secondary winding wound in mutual inductive relation on said core, a magnetizable control core linked in direct inductive relation with said secondary winding, said control core being independent of said primary winding and having no effect on the exciting current flow in said primary winding, an alternating current control coil wound on said control core, switch means connecting said control coil in series circuit with said secondary winding to permit reversing of the connection of said control coil, and a control coil wound on said control core for connection with a source of variable direct current, said last named control coil operating to variably saturate said control core to alter the impedance in the circuit of said secondary winding and thereby vary the current output of said transformer.

4. In a variable current transformer, a magnetizable transformer core, a primary winding and a secondary winding wound on said core in mutual inductive relation, a magnetizable control core linked in direct inductive relation with said secondary winding and being magnetically separate from said transformer core, an alternating current control coil wound on said control core and connected in series with said secondary winding to vary the inductance in the circuit of the secondary winding, means to vary the number of turns of said control coil connected in the circuit, switch means to reverse the connection of said control coil in the circuit, and electrical means to vary the reluctance of said control core to alter the impedance in the circuit of said secondary winding and thereby vary the current output of the transformer.

5. In an arc welding system, a magnetizable transformer core, a primary winding wound on said core and connected to a source of alternating current, a secondary winding wound on said core in inductive relation with said primary winding, a rectifier connected in circuit with said secondary winding, a control core linked in inductive relation with said secondary winding and being magnetically separate from said transformer core and said primary winding, a control coil wound on said control core and connected in circuit with the output of said rectifier for feed back therefrom to vary the reluctance of said control core by varying the flux saturation thereof, means to control the amount of feed back to said control coil, a variable coil wound on said control core, and a reversing switch adapted to connect said variable coil in series circuit with said secondary winding and to reverse the connection of the variable coil to alternately aid or oppose the alternating flux in said control core created by said secondary winding.

6. In a three-phase transformer, a magnetizable core having three parallel connected legs, a primary winding wound on each of said legs, a secondary winding wound on each of said legs and being disposed adjacent said primary winding, three control cores of magnetizable material, said control cores being linked one with each of said secondary windings to form impedances in the circuits thereof and being independent of said primary winding, a control coil wound on said control cores and connected to a variable source of direct current to vary the flux saturation of said control cores, three variable alternating current coils wound one to each control core and connected in series circuit with the corresponding secondary winding to vary the inductance in the secondary winding circuits, and means to reverse the connection of said variable coils in the respective secondary winding circuits to effect the addition or deduction of inductance in the secondary winding circuits.

7. In a three phase transformer, a magnetizable core having three parallel connected legs, a primary winding and a secondary winding wound on each of said legs in mutual inductive relation, each of said primary windings being connected across a different phase of a source of three phase alternating current, three magnetizable control cores linked one with each of said secondary windings, said control cores being independent of said primary windings and having no effect on the exciting current flow in said primary windings, control windings disposed on said cores and connected to a variable source of direct current, three alternating current control coils wound one to each of said control cores and connected in series with a corresponding secondary winding, and means to vary the number of turns of said control coils connected with the secondary windings.

8. A three phase transformer comprising a magnetizable transformer core, three primary windings arranged on said transformer core with each winding being connected to a different phase of a three phase alternating current source, three secondary windings arranged on said core in inductive relation with said primary windings, a control core means inductively linked with said secondary windings and being independent of said primary windings, means to vary the reluctance of said control core means, and variable inductance alternating current coil means wound on said control core means and connected in circuit with said secondary windings to vary the inductance in the circuits of said secondary windings.

9. In a direct current supply system, a three-legged magnetizable transformer core, three primary windings wound one to each of the legs of said core and connected one to each of the three phases of a source of three phase alternating current, secondary windings arranged in inductive relation with said primary windings and connected through rectifying means to a load, three control cores inductively linked one with each of said secondary windings and being magnetically separate from said primary windings, control coils wound on said control cores and connected in circuit with the output of said rectifying means and said load to vary the reluctance of said control cores, three variable coils wound one to each of said control cores and connected in series with said secondary windings to vary the inductance of the circuit of said secondary windings, and three reversing switches connected one in each of the secondary winding circuits and being operable to reverse the connection of said variable coils to permit addition and deduction of inductance in the secondary winding circuits.

10. In a variable current transformer, a primary winding connected to a source of power, an output circuit having a secondary winding in inductive relation with said primary winding, a control core formed of magnetizable material entirely independent of said primary winding and linked in direct inductive relation with said secondary winding, and a variable alternating current control coil wound on said control core and connected in series with said secondary winding.

11. A variable current transformer comprising a transformer core of magnetizable material, a primary winding wound on said core, a secondary winding wound on said core in inductive relation to said primary winding, a control core of magnetizable material linked in direct inductive relation with said secondary winding, said control core being independent of said primary winding and having no effect on the exciting current flow in said primary winding, an alternating current control coil wound on said control core, and a reversing switch connecting said control coil in circuit with said secondary winding to permit the reversing of the connection of said control coil.

References Cited in the file of this patent

UNITED STATES PATENTS

| | | |
|---|---|---|
| 2,306,998 | Claesson | Dec. 29, 1942 |
| 2,346,997 | Priest | Apr. 18, 1944 |
| 2,519,425 | Barlow | Aug. 22, 1950 |
| 2,644,109 | Mulder | June 30, 1953 |